United States Patent

Tomassini et al.

Patent Number: 4,475,788
Date of Patent: Oct. 9, 1984

[54] COUPLING BETWEEN LASER AND OPTICAL FIBER

[75] Inventors: Maurizio Tomassini; Eugenio Penco, both of Rome; Angelo Tranquilli, Frascati, all of Italy

[73] Assignee: Selenia, Industrie Elettroniche Associate, S.p.A., Rome, Italy

[21] Appl. No.: 341,163

[22] Filed: Jan. 21, 1982

[30] Foreign Application Priority Data

Jan. 22, 1981 [IT] Italy .................. 47615 A/81

[51] Int. Cl.³ .............................................. G02B 7/26
[52] U.S. Cl. ........................... 350/96.20; 350/96.18; 350/453
[58] Field of Search ................. 350/96.18, 96.20, 453

[56] References Cited

U.S. PATENT DOCUMENTS 4,199,222  4/1980  Ikushima et al. ............. 350/96.20

FOREIGN PATENT DOCUMENTS 2026194  1/1980  United Kingdom ............ 350/96.20

OTHER PUBLICATIONS

"Optical Connector Measurement System", IBM Technical Disclosure Bulletin, Kolodzey et al., 350, #96.20, vol. 22, No. 1, Jun. 1979, pp. 47-48.

Primary Examiner—John D. Lee
Assistant Examiner—Akm E. Ullah
Attorney, Agent, or Firm—Karl F. Ross

[57] ABSTRACT

In order to focus the beam of a laser onto a receiving end of an optical fiber substantially coaxial therewith, the laser output is formed by a planoconvex lens with a semitransparent flat face confronting the laser cavity and an antireflecting curved face turned toward the fiber. Alignment of the laser beam with the fiber axis is accomplished by the adjustment of two oppositely pointing juxtaposed wedges interposed between the lens and the laser.

6 Claims, 2 Drawing Figures

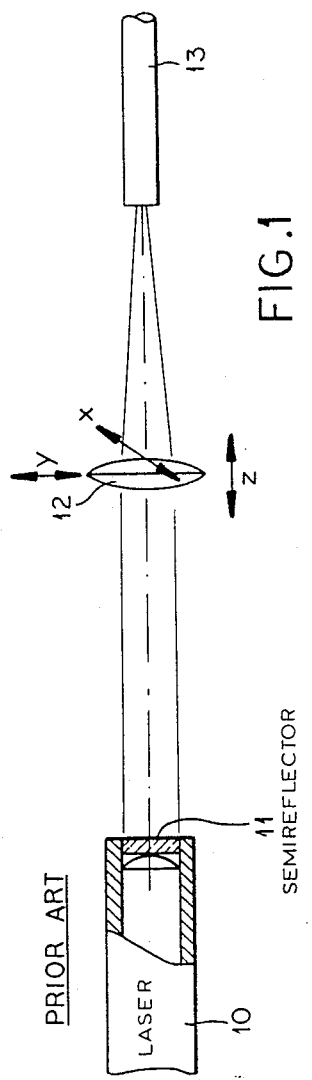
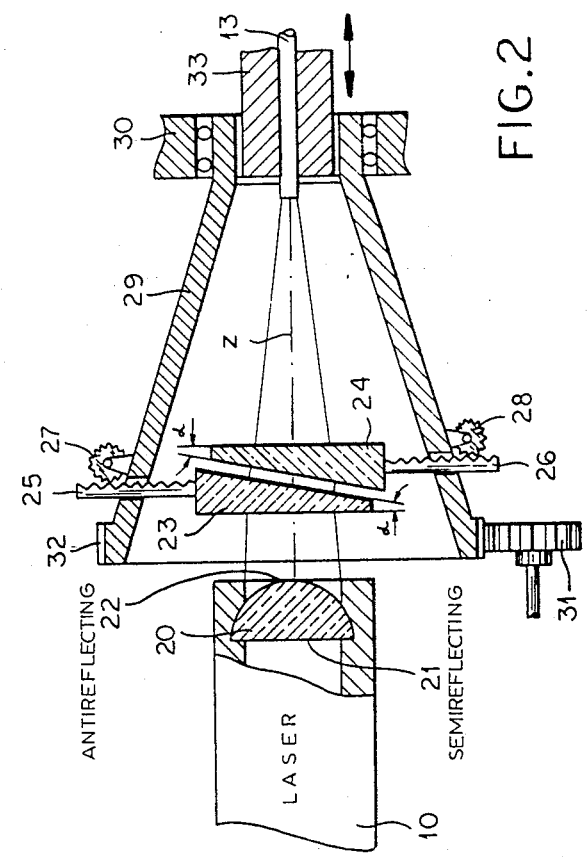

COUPLING BETWEEN LASER AND OPTICAL FIBER

FIELD OF THE INVENTION

Our present invention relates to a light-transmitting system in which a laser beam with a wavelength in the visible or an adjoining part of the spectrum is trained upon an optical fiber.

BACKGROUND OF THE INVENTION

Since the diameter of the light-receiving or input end of a fiber is usually much smaller than that of the output end of a laser cavity, it is customary to interpose a converging lens between the laser and the fiber for focusing the laser beam upon the fiber axis. Thus, for example, a gas laser with a power of about 10 to 100 W may have a cavity 1 to 10 mm in diameter compared with a fiber diameter of 0.3 mm. The lens should have a fairly large focal length so that the angle of incidence of the limiting rays of the converging beam does not exceed the critical angle of the fiber material.

For a proper focusing of the laser beam upon the fiber axis, the lens should have a mounting enabling its translational as well as angular adjustment relative to the laser and the fiber. Such mountings have a rather complex structure and are correspondingly expensive to produce.

OBJECT OF THE INVENTION

Thus, the object of our present invention is to provide an improved and highly efficient coupling between a laser and an optical fiber which is of relatively simple construction and reliable in operation.

SUMMARY OF THE INVENTION

In accordance with our present invention, the output end of a laser cavity is closed by a converging lens replacing the usual semireflecting mirror as well as the aforementioned focusing lens. This converging lens has a preferably planar semireflecting inner face turned toward the cavity, its convex outer face being advantageously provided with an antireflection coating as is well known per se. We further provide micrometrically adjustable afocal means interposed between the lens and the input end of the fiber for enabling alignment of the beam with the fiber axis; the latter means may comprise a pair of relatively movable wedges which converge in opposite directions and are provided with a support rotatable about that axis, this support preferably serving as a light shield which prevents illumination of the fiber by extraneous sources.

BRIEF DESCRIPTION OF THE DRAWING

The above and other features of our invention will now be described in greater detail with reference to the accompanying drawing in which:

FIG. 1 schematically illustrates a conventional focusing lens interposed between a laser and an optical fiber; and FIG. 2 is an axial sectional view of an optical coupler embodying our invention.

SPECIFIC DESCRIPTION

FIG. 1 shows a laser 10 whose cavity is closed at an output end by a semireflecting mirror 11 whose face, confronting that cavity, could be spherically curved (as illustrated) or flat. A lens 12 lies in the path of the emitted laser beam and focuses same upon the end face of an optical fiber 13 whose axis, like that of the laser, substantially coincides with the lens axis z. The lens is shiftable in its two transverse dimensions x and y and is also tiltable in the xz and yz planes by micrometric devices; its distance from the confronting fiber end substantially equals its focal length and can likewise be adjusted.

In FIG. 2 we have shown the cavity of laser 10 closed at its output end by a planoconvex lens 20 with a semireflecting flat face 21 confronting the cavity and an antireflecting curved face 22 turned toward the fiber 13 which is substantially centered on the combined lens and laser axis z. The converging beam leaving the lens 20, whose focal length may lie in a range of 5 to 10 cm, traverses two oppositely pointing wedges 23 and 24 of identical refractive index having small vertex angles $\alpha$ of like magnitude, preferably 2°. These wedges are mounted on respective racks 25, 26 which are in mesh with associated pinions 27, 28 supported on a frustoconical light shield 29; the latter is journaled in a bearing 30 and can be rotated about the axis of fiber 13 by a pinion 31 engaging a toothed rim 32 of that light shield. Fiber 13 is held in a bushing 33 rigid with the outer race of bearing 30.

Racks and pinions 25–28 as well as gearing 31, 32 constitute micrometric devices enabling the spacing of wedges 23, 24 to be varied and further enabling the pair of wedges to be swung about the fiber axis whereby an offset between the axes of the beam impinging on wedge 23 and the beam leaving the wedge 24 can be modified in magnitude and in orientation. When the two wedges contact each other, they act as a transparent plate having no effect upon the beam position.

The unit consisting of the fiber-supporting bushing 33 and the wedge-supporting light shield 29 need only be displaceable in the axial direction z for precise focusing; the distance of the wedges 23, 24 from lens 20 is obviously not critical. With the spacing of unit 29, 33 from laser 10 and the positions of the wedges within that unit firmly established, the coupling between the laser and the optical fiber 13 is very stable.

We claim:

1. In a light-transmitting system including a laser with a cavity having an output end for the emission of a luminous beam, an optical fiber having an input end confronting said output end, and refractive means for focusing said beam onto said output end, the improvement wherein said refractive means comprises a converging lens at said output end having a semireflecting face turned toward said cavity, and micrometrically adjustable afocal means interposed between said lens and said input end for enabling alignment of said beam with the fiber axis.

2. The improvement defined in claim 1 wherein said lens is planoconvex, said semireflecting face being planar.

3. The improvement defined in claim 2 wherein said lens has an antireflecting convex face confronting said input end.

4. The improvment defined in claim 1, 2 or 3 wherein said afocal means comprises a pair of relatively movable wedges converging in opposite directions, said wedges being provided with support means rotatable about the fiber axis.

5. The improvement defined in claim 4 wherein said wedges have identical angles of convergence of approximately 2°.

6. The improvement defined in claim 4 wherein said support means comprises a frustoconical light shield converging from the vicinity of said output end to the vicinity of said input end.

* * * * *